INVENTOR.
Albert D. Rittmann
BY
Robert E. Fowler
ATTORNEY

Feb. 6, 1968 A. D. RITTMANN 3,368,123

SEMICONDUCTOR DEVICE HAVING UNIFORM CURRENT DENSITY ON EMITTER PERIPHERY

Filed Feb. 4, 1965 2 Sheets-Sheet 2

INVENTOR.
Albert D. Rittmann
BY
Robert E. Fowler
ATTORNEY 3,368,123
SEMICONDUCTOR DEVICE HAVING UNIFORM CURRENT DENSITY ON EMITTER PERIPHERY
Albert D. Rittmann, Kokomo, Ind., assignor to General Motors Corporation, Detroit, Mich., a corporation of Delaware
Filed Feb. 4, 1965, Ser. No. 430,344
10 Claims. (Cl. 317—235)

ABSTRACT OF THE DISCLOSURE

This disclosure concerns an improved interdigitated electrode design for contiguous regions of alternate conductivity type in which potential drops in the respective regions are matched to provide a uniform current density along a p-n junction between the two regions.

This invention relates to the design and configuration of the electrodes of semiconductor devices in order to obtain the most efficient operation.

In semiconductor devices in which emitter electrodes are used, the most useful area of the emitter for the injection of minority carriers into the base is that area adjacent the periphery. The injection efficiency falls off so rapidly in moving inwardly from the edge that the active area of an emitter electrode may be considered as a constant times the emitter perimeter. The central part of the emitter is substantially useless because the IR voltage drop in the base region causes the center of the emitter area to have a smaller forward voltage drop than the edges. Therefore, with an applied base-emitter voltage, only the emitter periphery has sufficient forward conduction. If all of the periphery of the emitter were at one potential and all of the base adjacent the emitter periphery at another potential then all of the emitter periphery could be considered useful. This, however, does not always occur but the emitter to base potential drop along the emitter periphery usually varies. When it does, then that portion where the potential drop is greatest will be more active in forward injection than the remainder and the device will not provide maximum efficient operation.

It is, therefore, an object in making this invention to provide semiconductor structure in which the potential across the entire periphery of the emitter-base junction will be approximately the same;

It is a further object in making this invention to provide semiconductor structure in which the emitter and base electrodes are so formed that when bias voltages are applied the emitter to base potential drop at all points along the perimeter of the emitter-base will be approximately constant.

It is a still further object in making this invention to provide semiconductor electrode structure in which an emitter of maximum peripheral length is provided which has a substantially constant base-emitter bias along the whole periphery.

With these and other objects in view, which will become apparent as the specification proceeds, my invention will be best understood by reference to the following specification and claims and the illustrations in the accompanying drawings, in which:

Figure 2:
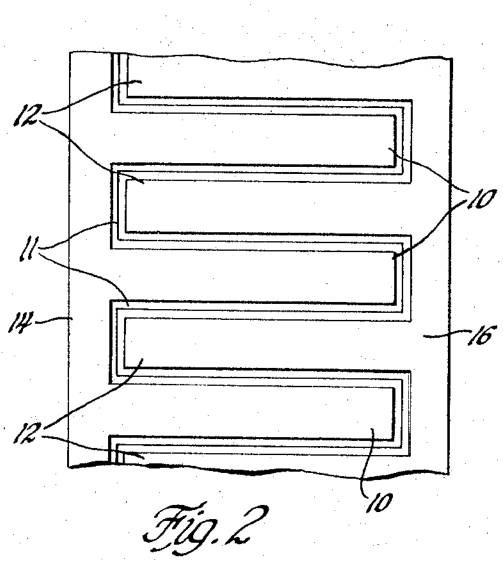
FIG. 2 is a partial top plan view showing a conventional emitter-base electrode configuration.
Figure 3:
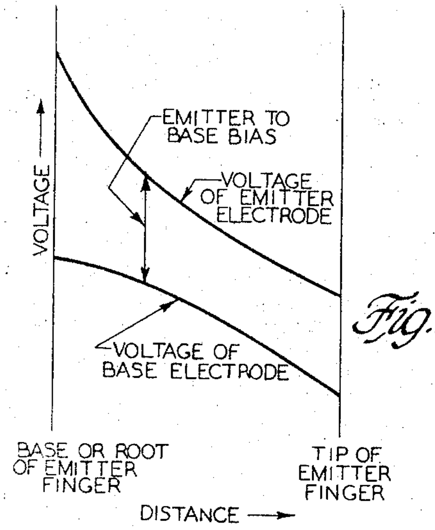
Figure 4:
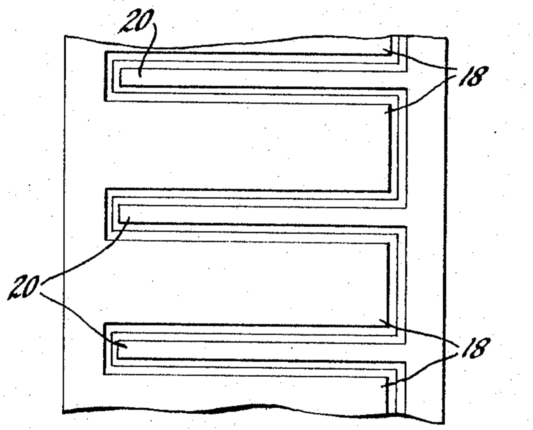
FIG. 4 is a partial top plan view showing one emitter-base electrode configuration embodying my invention.
Figure 5:
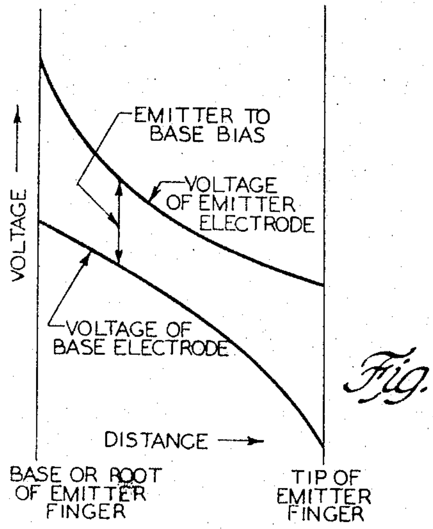
Figure 6:
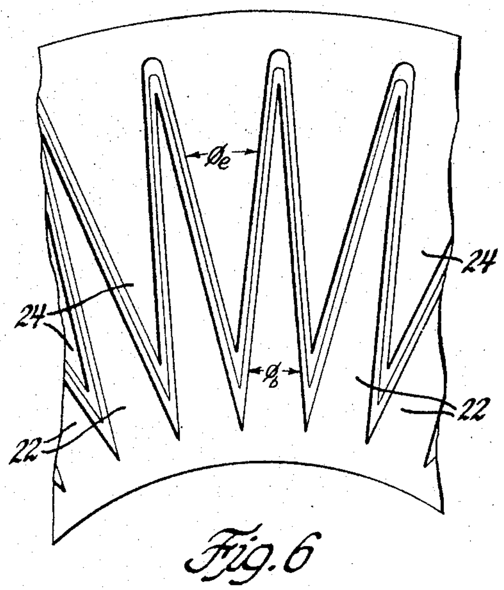
Figure 7:
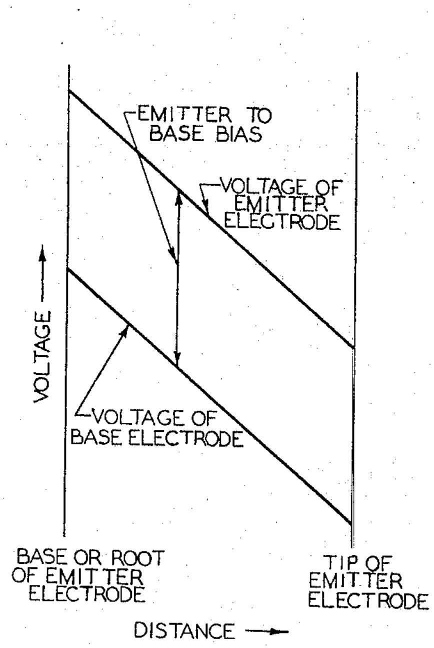
Figure 8:
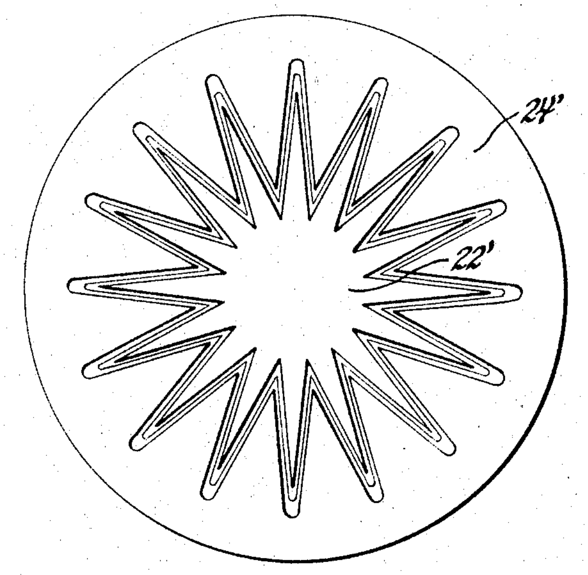
Figure 9:
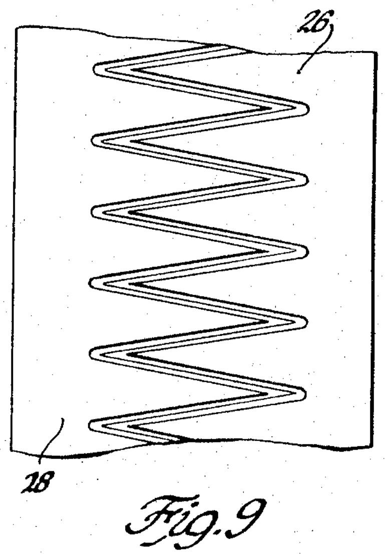

FIGS. 6, 8, and 9 are similar top plan views showing modified forms of base-emitter configurations embodying my invention; and, FIGS. 3, 5, and 7 are plots of the voltage of the emitter finger as a function of position along its length and of the voltage of the base finger for corresponding positions for the structures shown in FIGS. 2, 4, and 6, respectively.

In order to obtain a design in which all points along an extended emitter periphery may have the same degree of forward bias, one of the best configurations which can be used is that of an interdigitated emitter-base structure. This is, of course, not the only form but is an excellent design from this angle. This type of electrode structure provides a maximum length of emitter periphery on a given size of semiconductor wafer. Having obtained a maximum length of periphery by such configuration, the next consideration is to make the emitter and base fingers as narrow as possible as the area covered by the same is not useful or is wasted. If long, narrow interdigitated fingers are used, there may be an IR voltage drop along the length of both the emitter and base finger. If the IR voltage drop per unit length along the emitter finger can be designed to be equal to that along the base finger, then the voltage difference between the emitter and interdigitated base will be the same at all points along the periphery and the entire periphery will be active.

Figure 1:
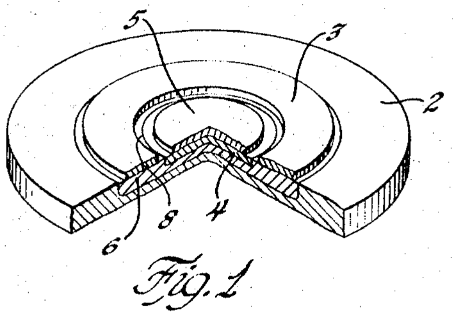
FIGURE 1 is a perspective view of a conventional semiconductor wafer having emitter and base electrodes with parts broken away and shown in section.

FIG. 1 of the drawings shows a conventional type of semiconductor device in which a wafer 2 of semiconductor material, such, for example, as silicon or germanium has on its upper surface an emitter electrode 4 and a base electrode 6 extending under said emitter electrode and then up around the periphery thereof to form a circular rectifying junction 8. The emitter electrode 4 is shown as a circular central member diffused into and forming said rectifying junction with the base 6. The base electrode 6 surrounds the emitter region. It is obvious from this showing that the emitter periphery is not extensive. In order to introduce current into the emitter and base electrodes 4 and 6 suitable conductive layers 5 and 3 are ohmically secured to the exposed faces and extend up to a point as close as possible to the rectifying junction 8. These conductive surfaces are considered to be a part of the electrode structure and leads are connected thereto.

FIG. 2 shows an enlarged top view of a conventional transistor with interdigitated emitter in which the emitter area is defined by area 10, and the base contact area is defined by area 12. The area shown is the conductive layer, the area below each conductive area being that which forms the rectifying junction diagrammatically shown by line 11 between the two areas. The external connection for the emitter current is made at region 14, and the external connection for the base current is made at region 16. The emitter current which flows into the transistor must flow from region 14 longitudinally along the length of the emitter finger to the appropriate portion of the periphery of the emitter. The purpose of the interdigitated emitter structure is to achieve a greater emitter periphery for a given area transistor element.

It is common practice to metallize, to a uniform thickness, the greater portion of both emitter and base contact areas as shown in both FIGS. 1 and 2, and consequently when the emitter and base fingers are of equal width, the resistance per unit length of emitter and base fingers is reasonably uniform and equivalent. The emitter current is equal to beta, the common emitter current gain, times the base current, and consequently the voltage drop along the length of the emitter finger will be higher than the voltage drop along the length of the base finger by a factor of approximately beta. This in itself makes the emitter to collector bias much greater at the base or root of the emitter finger than it is at the other portions of the emitter periphery.

In addition, consideration must be given to the fact that the emitter finger metallization does not carry the same longitudinal current at all regions. It is easily seen that the portion of the emitter finger close to the base or root of the emitter finger carries more emitter current to the contact area 14 than does the tip of the emitter finger. Consequently the voltage drop per unit length at the base of the emitter finger is greater than the voltage drop per unit length at the tip of the emitter finger.

This same argument holds true for the base finger, and there also the voltage drop per unit length is greater at the root or base of the base finger than it is at the tip of the base finger.

FIG. 3 shows the voltage of the emitter finger electrode as a function of position along its length and also shows the voltage of the base finger at corresponding positions, for structure as shown in FIG. 2. Note that the emitter to base bias is greatest at the base or root of the emitter finger. Emitter injection will, therefore, be highest at the base or root of the emitter finger.

FIG. 4 shows an enlarged section of one design of interdigitated emitter and base fingers embodying my invention. In this form emitter fingers 18 are shown extending to the right between base fingers 20. In using a rectangular configuration of finger, one way of equating voltage drops along adjacent peripheries is by making the width of the emitter finger W times that of the base finger. When the current flowing in each emitter finger is W times that flowing in each base finger, then the voltage drop per unit length along each emitter finger will be approximately the same as the voltage drop per unit length along the length of each base finger. This becomes of greater importance when the transistor reaches maximum current handling capacity and it is helpful to select a figure for W which would be in the vicinity of 2 to 20 or a figure for W which is approximately equal to the common emitter current gain at the high current level.

FIG. 5 shows the voltage of the emitter finger electrode as a function of position along its length and also shows the voltage of the base finger at corresponding positions, all for a structure as shown in FIG. 4. When W is equal to the common emitter current gain, the emitter to base bias at the base or root of the emitter finger is equivalent to the emitter to base bias at the tip of the emitter finger. In this structure both the root and tip of the emitter finger have high injection, and an advantage is gained over the structure shown in FIG. 2.

It can be seen, however, by referring to FIG. 5 that the entire emitter periphery is not being fully utilized. A structure wherein the entire emitter periphery has the same emitter to base bias would give a further improved current handling capacity.

FIG. 6 shows a modified form of invention in which the base and emitter fingers are shown in a triangular configuration. In this instance the base fingers 22 are shown in interdigitated relation with the emitter fingers 24. In such a configuration if the emitter and base metallic conductor thicknesses are equal, if the longitudinal electrical conductivity is proportional to the width of the emitter and base finger at any given point, then the voltage drop due to longitudinal current will be uniform along the entire emitter length and also will be uniform along the entire base length. If the angle subtended by the emitter finger $\phi_e$ is equal to the angle subtended by the base finger $\phi_b$ times W, the emitter to base bias along all points of the emitter periphery will be uniform when the common emitter current gain is approximtaely equal to W. Under these circumstances a structure along the lines shown in FIG. 6 is obtained in which the interdigitated triangular shaped emitter and base electrodes curve toward the base contact and if carried to a sufficient degree would form a circle.

This result is shown in FIG. 8 where the base electrode 22′ is shown as a multi-pointed star completely surrounded by the emitter electrode 24′.

FIG. 7 shows the voltage of the emitter finger electrode as a function of position along its length and also shows the voltage of the base finger at corresponding positions, for a structure as shown in FIG. 6. In this structure when the common emitter current gain is approximately equal to W, the emitter to base bias is completely uniform at all regions of the emitter periphery and the desired result of uniform and maximum peripheral emitter injection has been accomplished.

The overall configuration can, of course, be further modified by varying the thickness of the emitter and base electrodes. If the emitter electrode is made of thicker material than the base, then the emitter contact can be made W times thicker than the base contact and the two subtended angles $\phi_e$ and $\phi_b$ can be made equal, making a straight line relation such as shown in FIG. 9 between the base electrode 26 having interdigitated fingers extending to the left and the emitter electrode 28 having equal size and spaced fingers extending toward the right. This variation of thickness in order to obtain equal conductivity can also be applied to rectangular fingers and would tend to equalize the size of the emitter and base fingers. Again, the thickness could be varied between the base of the finger and the tip in order to tailor or control the amount of conductivity desired. All of these factors permit the designer to produce a uniform voltage gradient along the length of the emitter and base fingers so that all points of the emitter periphery would have the same degree of emitter to base bias and, therefore, all points would be active and form various geometrical configurations.

What is claimed is:

1. A semiconductor device comprising a wafer of semiconductor material, a first region of one conductivity type, in a surface of said wafer, including a web and fingerlike portions extending from a side thereof, a second region, in said surface of the wafer, of the opposite conductivity type including a web and fingerlike portions extending from a side thereof, the fingerlike portions of the first region being interdigitated with the fingerlike portions of the second region, said first and second regions forming a p-n junction having an elongated continuous edge in said surface, ohmic electrodes respectively covering the surface of each said regions and terminating at a narrow uncovered margin adjacent the edge of said p-n junction, and each of said fingerlike portions of the first and second regions respectively comprising resistance means for providing uniform current density, in cooperation with the resistance means of the other region, throughout the area of said p-n junction.

2. The semiconductor device as defined in claim 1 wherein the semiconductor material is selected from the group consisting of germanium and silicon.

3. The semiconductor device as defined in claim 2 wherein at least one of said regions is a diffused area in said surface.

4. A transistor comprising a wafer of semiconductor material of one conductivity type, contiguous emitter and base regions in a surface of said wafer, said emitter region including a web and fingerlike portions extending from a side thereof, said base region including a web and fingerlike portions extending from a side thereof, the fingerlike portions of the emitter region being interdigitated with the fingerlike portions of the base region, said emitter and base regions being of alternative conductivity type and forming a p-n junction having an elongated continuous edge in said surface, ohmic electrodes respectively covering the surface of each said regions and terminating at a narrow uncovered margin adjacent the edge of said p-n junction, and each of said fingerlike portions of the emitter and base regions respectively comprising resistance means for providing uniform current density, in cooperation with the resistance means of the other region, throughout the area of said p-n junction.

5. The transistor as defined in claim 4 wherein the base region is of said one conductivity type and said emitter region is of opposite conductivity type.

6. The transistor as defined in claim 4 wherein said base region is a diffused region in the surface of the wafer of opposite conductivity type to that of the wafer.

7. The transistor as defined in claim 4 wherein the interdigitated fingerlike portions are wedge-shaped, with emitter fingerlike portions having larger subtended angles than base fingerlike portions, and the area of interdigitation is arcuate around at least a portion of the base region.

8. The transistor as defined in claim 7 wherein the subtended angle of the emitter fingerlike portion is approximately W times larger than the subtended angle of the base fingerlike portion and W equals the common emitter current gain.

9. The transistor as defined in claim 4 in which the ohmic electrodes in contact with the emitter and base fingerlike portions are of tapering thickness.

10. The transistor as defined in claim 4 wherein the emitter and base ohmic electrodes are of substantially uniform thickness and corresponding parts of emitter and base fingerlike portions have a width relationship of about *W*:1, respectively, where W is from 2 to 20.

References Cited

UNITED STATES PATENTS

| | | | |
|---|---|---|---|
| 2,951,191 | 8/1960 | Herzog | 317—235 |
| 2,994,834 | 8/1961 | Jones | 317—235 |
| 3,214,652 | 10/1965 | Knowles | 317—235 |

FOREIGN PATENTS

| | | |
|---|---|---|
| 1,358,189 | 3/1964 | France. |

JAMES D. KALLAM, *Primary Examiner.*